(No Model.)
J. McC. SETTLE.
FRUIT CONDUCTOR OR CONVEYER.
No. 486,357. Patented Nov. 15, 1892.
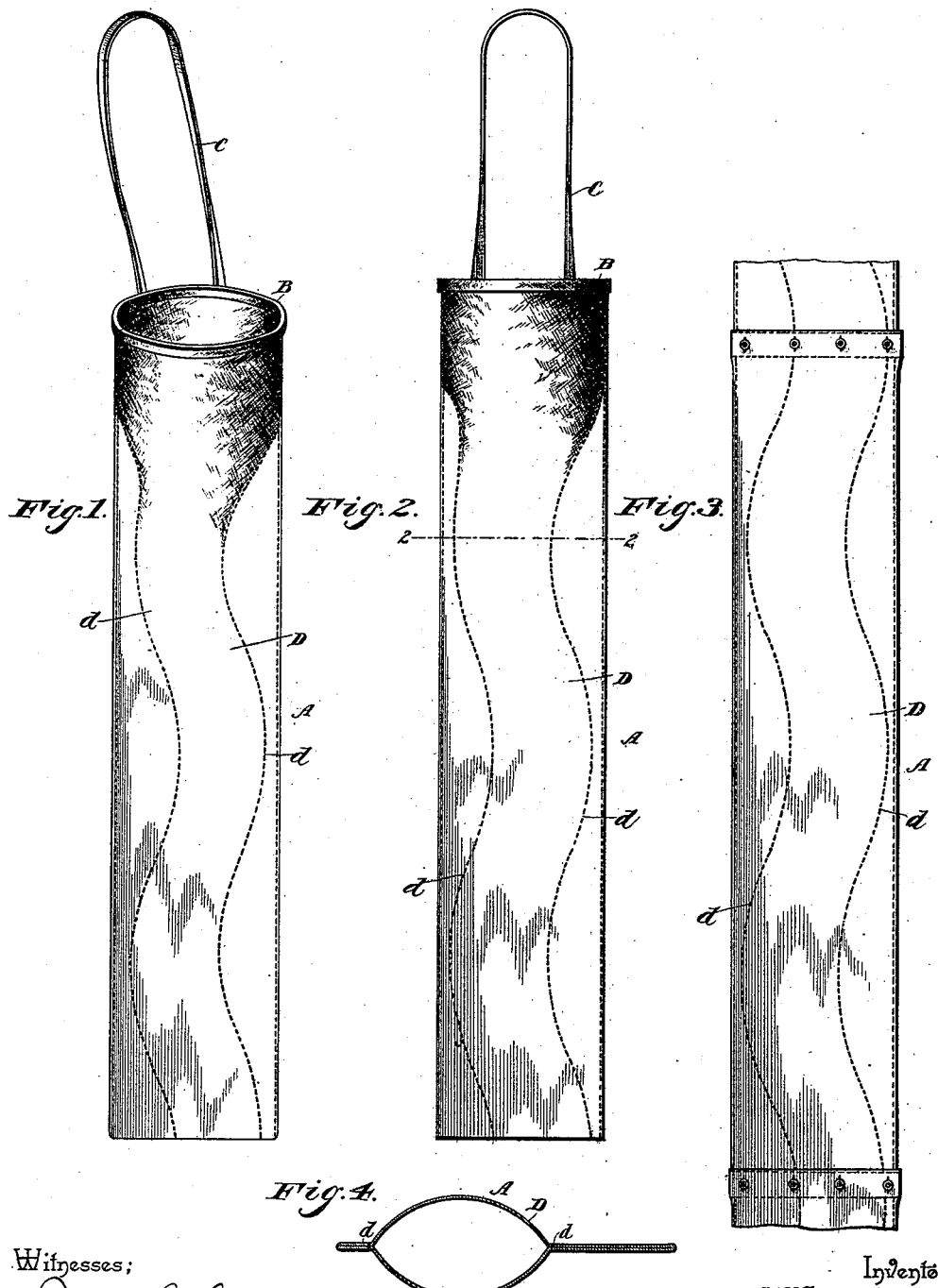
Witnesses:
Inventor,
Jas. McC. Settle,
By his Attorneys,
C. A. Snow & Co.

UNITED STATES PATENT OFFICE.

JAMES McCOWN SETTLE, OF SOUTH JACKSONVILLE, FLORIDA.

FRUIT CONDUCTOR OR CONVEYER.

SPECIFICATION forming part of Letters Patent No. 486,357, dated November 15, 1892.

Application filed March 11, 1892. Serial No. 424,601. (No model.)

*To all whom it may concern:*

Be it known that I, JAMES McCOWN SETTLE, a citizen of the United States, residing at South Jacksonville, in the county of Duval and State of Florida, have invented a new and useful Fruit Conductor or Conveyer, of which the following is a specification.

My invention relates to new and useful improvements in fruit conductors or conveyers; and it consists in the combination and arrangement of parts hereinafter more fully described, and pointed out in the claims.

The object of my invention is to simplify the construction of devices of this character and provide means for conducting fruit to the ground without injuring or bruising the same.

In the drawings, Figure 1 represents a perspective view of my improved device shown in position for use. Fig. 2 represents a plan view of a portion thereof, showing the manner of forming the chute therein. Fig. 3 represents the device shown as made in sections and connected together. Fig. 4 is a transverse section on the line 2 2 of Fig. 2, showing the tube open.

Referring to the drawings, A designates my improved fruit conductor or conveyer, which is constructed of any preferred kind of material, such as leather, canvas, &c. The upper end of the conveyer is provided with a hoop or band B and also with a shoulder-strap C, which may be thrown over the shoulder while gathering fruit or be connected to a portion of the tree or bush from which it is being gathered. The contour of the conductor or conveyer is that of an elongated bag, which, as shown in Fig. 3, may be made in sections and connected by suitable devices. In either form, as shown by Fig. 1 and by Fig. 3, a serpentine tube D is formed longitudinally therein by running parallel lines of stitches *d* from the top to the bottom thereof and which may be continued through the sections. The lines of stitches alternately run from one edge of the conductor or conveyer to the other in easy and graceful curves, thereby forming a regular passage-way, which is less liable to become choked than if abruptly formed.

As the fruit is gathered it is dropped into the upper or mouth end of the conductor or conveyer and travels downward through said serpentine tube or passage, being prevented from having a too-rapid fall by the tortuous arrangement of said tube or passage. The lower end of the conductor or conveyer may be placed in the basket or other receptacle to be filled and readily transferred from one to another as found desirable.

Heretofore in devices of this class the construction has been cumbersome and inconvenient, while by my improved construction I am enabled to readily place the conductor in position for use or fold it for storage when in disuse.

It will be seen that the upper section of the bag may be used alone to pick fruit from the lower branches or limbs of a tree, and when used at higher elevations the several sections may be applied to lengthen the conductor or conveyer as much as may be found necessary. The size of the fruit does not affect the speed of passage of the fruit through the conveyer, as the surplus cloth or material on either side of the tube serves to hold the latter in shape and keep it from sagging or choking.

Heretofore chutes or tubes of this or analogous construction and arrangement have been either formed with elbows at the ends or straight joints, thereby causing the fruit to have a straight fall the entire length of the chute and striking in the elbows and injuring the same by bruising and crushing, or a simple tube having bends at predetermined distances without a reinforce on the side thereof to steady the same.

The flexible feature of my improved conductor or conveyer, whereby it may be folded and readily stored or again easily set up for use, together with the surplus cloth reinforcing the sides of the serpentine tube formed therein, with the advantages set forth for said construction, render the invention of material import in the art to which it appertains.

Having thus described my invention, what I claim as new is—

1. A fruit conductor or conveyer consisting of a flexible piece of material of elongated form, having a serpentine tube or passage therein, formed by parallel rows of stitches alternately curving from side to side thereof, substantially as described.

2. A fruit conductor or conveyer made of flexible material and of elongated form and having parallel rows of stitches running therethrough in serpentine form to provide a tortuous tube or passage, substantially as described.

In testimony that I claim the foregoing as my own I have hereto affixed my signature in the presence of two witnesses.

JAMES McCOWN SETTLE.

Witnesses:
   JAMES H. WILSON,
   JOHN F. ROLLINS.